United States Patent [19]

Brearley

[11] Patent Number: 4,743,072
[45] Date of Patent: May 10, 1988

[54] VEHICLE BRAKING SYSTEM
[75] Inventor: Malcolm Brearley, Solihull, England
[73] Assignee: Lucas Industries public limited company, Birmingham, England
[21] Appl. No.: 868,560
[22] Filed: May 30, 1986
[30] Foreign Application Priority Data
May 30, 1985 [GB] United Kingdom ............... 8513688
[51] Int. Cl.[4] ............................................. B60T 13/68
[52] U.S. Cl. ...................................... 303/15; 303/107; 303/20
[58] Field of Search ................... 303/15, 20, 107, 104, 303/108, 100, 102, 91, 93, 94, 95, 96, 97, 98, 99
[56] References Cited
U.S. PATENT DOCUMENTS

| | | | |
|---|---|---|---|
| 3,993,363 | 11/1976 | Skoyles et al. ................... | 303/102 |
| 4,037,882 | 7/1977 | Taylor ................................ | 303/107 |
| 4,043,608 | 8/1977 | Bourg et al. ...................... | 303/104 |
| 4,538,228 | 8/1985 | Brearey et al. ................... | 303/20 |

Primary Examiner—Duane A. Reger
Assistant Examiner—Matthew C. Graham
Attorney, Agent, or Firm—Scrivener and Clark

[57] ABSTRACT

A closed loop vehicle deceleration control system comprising a plurality of pressure control channels controlled by a fed forward driver's demand signal representing a deceleration requirement, and a closed loop feedback circuit which is adapted to produce a deceleration error signal representative of the difference between a deceleration level demanded by the driver and the actual vehicle deceleration. The driver's demand signal is arranged to be adjusted by means of a correction signal dependent on an integral function of the deceleration error. Adjustment of the demand signals is made by way of a multiplier in which one input is the driver's demand signal and the other input is a correction signal derived from a deceleration integrator. The correction signal is provided continuously by the integrator which the closed deceleration loop is adapted to be disabled at any selected time by disconnection of the deceleration error from the integrator input.

14 Claims, 3 Drawing Sheets

VEHICLE BRAKING SYSTEM

DESCRIPTION

The present invention is concerned with vehicle braking and in particular with an electrically controlled vehicle deceleration control system. Such a system might be included in, for example, passenger cars, commercial road vehicles, rail vehicles and the like to control the rate of deceleration in accordance with braking demands by the vehicle driver.

Electrically controlled braking systems are known which include an input transducer producing the driver's braking demands in electrical terms, a suitable electronic pressure controller, and electrical relay valves with integral pressure transducers on each axle of the vehicle. The system includes a pressure control loop taking an input signal from the brake pedal transducer which is used to provide a pressure error signal by comparison with a pressure transducer output signal, this pressure error forming the input to a pressure controller which generates an output signal which causes the pressure developed by an electro-pneumatic or electro-hydraulic converter to change in a direction such as to reduce the pressure error amplitude.

It is an object of the present invention to provide a vehicle braking system having improved electrical control of deceleration of the vehicle in response to driver braking demands.

In accordance with the present invention in its broadest aspect, there is provided a closed loop vehicle deceleration control system having pressure demand feedforward and correction based on integral action control via a plurality of pressure control channels.

In accordance with a second aspect of the present invention, there is provided a closed loop vehicle deceleration control system comprising a plurality of pressure control channels controlled by a fed forward driver's demand signal representing a deceleration requirement, and a closed loop feedback circuit which is adapted to produce a deceleration error signal representative of the difference between a deceleration level demanded by the driver and the actual vehicle deceleration, the driver's demand signal being arranged to be adjusted by means of a correction signal dependent on an integral function of the deceleration error.

In a preferred embodiment, the means of adjustment is provided by a multiplier in which one input is the driver's brake demand signal and the other input is a correction signal derived from a deceleration error integrator. This correction signal is continuously provided by the integrator but the closed deceleration loop may be disabled at any chosen time by disconnection of the deceleration error from the integrator input.

In this manner, the integrator can generate gradual correction of braking at a rate determined by the deceleration error amplitude and preset integrator time constants when the deceleration loop is closed or hold any generated correction level when the loop is opened. The integrator is preferably engineered in digital terms and is not therefore subject to intrinsic decay or drift so that any established correction level can be held indefinitely if the input is discontinued.

The deceleration error is used to generate an integrator input which is positive if the vehicle deceleration is below the demand level in which case, the integrator output causes the braking pressures to be gradually increased until the error is reduced to zero. Conversely, a vehicle deceleration which is greater than the demand level produces a negative error signal which is integrated to gradually reduce braking pressures until the desired deceleration level is achieved.

This integral action closed loop is arranged to be opened automatically under several conditions, typically below a preset low speed threshold, below a preset low deceleration demand at the input and under some conditions where skidding is detected as taking place during braking and where further boosting of braking would be unwarranted. Where brake pressure levels have reached the maximum permitted system pressure, further increase of integrator correction would also be inhibited.

Advantageously, the integral correction is made at more than one speed of integration, depending upon deceleration response to change of demand characterised by an initial fast integral action followed by a slower rate as the vehicle deceleration starts to respond.

Alternatively, the integral action takes place at the fast rate but the integral correction built up during the time between demand change and vehicle deceleration starting to respond is suddenly reduced by a preset proportion once this said response is detected.

In some embodiments, actual axle load measurement causes individual channel correction to be applied to the main multipliers so that any integral correction is modified in a load multiplier by a load figure for that channel causing thereby any deceleration error to be made up from error sources other than vehicle load so that the integral correction figure at the end of each stop can be accumulated to generate a brake condition monitoring factor of performance over a series of stops.

The system can include a means of generating a driver warning when this accumulated factor reaches a preset alarm level so as to prevent the closed loop system masking brake deterioration by generating large brake boost factors.

The invention is described further hereinafter, by way of example only, with reference to the accompanying drawings, in which.

Figure 1:
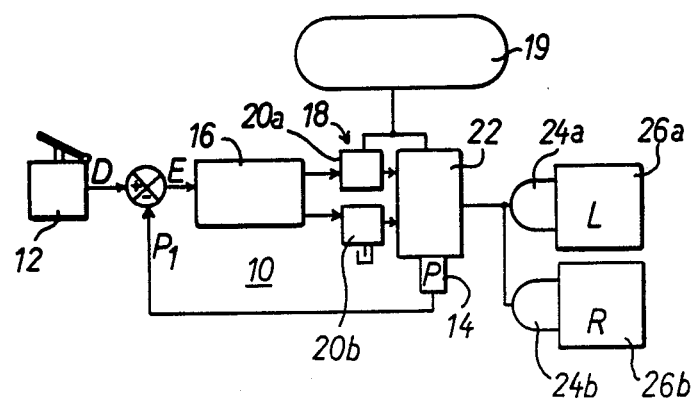
FIG. 1 illustrates a known electrically controlled braking system which responds to pressure errors.

Referring first to the known system of FIG. 1, this includes a pressure control loop 10 taking an electrical input signal D from a brake pedal transducer 12 which is used to provide a pressure error signal E by comparison with the output signal $P_1$ of a pressure transducer 14, this pressure error E forming the input signal causing the pressure developed by an electro-pneumatic or electro-hydraulic converter 18 to change in a direction such as to reduce the amplitude of the pressure error E. The converter 18 is supplied by a pneumatic or hydraulic reservoir 19, as appropriate.

The nature and circuit of the pressure controller 16 depends upon the type of converter 18 employed. Two such converter principles are well known, the analogue system in which a valve is employed with pressure output developed proportional to solenoid current and a digital system, as shown in FIG. 1, in which a pair of similar solenoid valves 20a, 20b is employed to raise or lower a control chamber pressure by selective energisation of these valves 20a, 20b. One form of pneumatic converter employs a relay valve 22 which responds to this control chamber pressure and which re-balances into the closed condition when the brake pressures at the brake actuators 24a, 24b for brakes 26a, 26b become equal to said control pressure. Such a valve has an advantage in that the control chamber pressure responds rapidly to valve opening giving a fast control loop which is accurate and respective.

Figure 2:
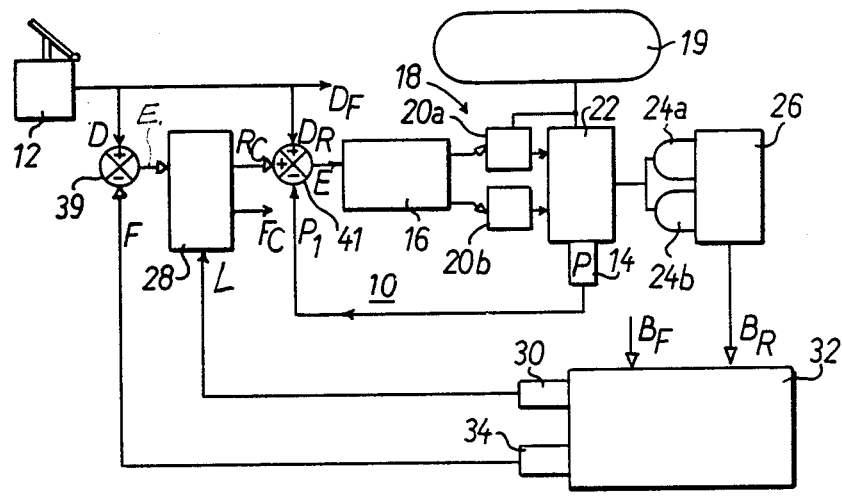
FIG. 2 illustrates a basic system in accordance with the present invention.

FIG. 2 shows a basic deceleration control system in accordance with the present invention, the inner loop of which is the known pressure control system of FIG. 1. The system of FIG. 2 employs a braking controller 28 which, as explained hereinafter in more detail, modifies the fed forward input braking demands D from the brake pedal transducer 12 before they are applied to the pressure control system. In practice, the braking demands D are typically separated into front ($D_F$) and rear ($D_R$) channels but in a full system may extend to four separate wheel channels.

Load signals L are obtained from one or more load transducers 30 on the vehicle 32 and vehicle deceleration signals F are obtained via a vehicle decelerometer 34. Front and rear braking signals $B_F$ and $B_R$ are applied to the vehicle brakes as indicated diagrammatically by the arrows.

Deceleration demand signals D are compared in a first adder/subtractor 39 with actual deceleration signal F from the decelerometer 34 to provide a basic deceleration error $E_1$ which is supplied to the braking controller 28, together with load signals L used for load apportioning, as described further hereinafter. The resulting corrected deceleration error $F_C$ (front) and $R_C$ (rear) signals are combined in a second adder/subtractor 41 with the "feedforward" signal $D_R$, from the demand transducer 12, and the pressure feedback signal $P_1$ to provide the pressure error signal E for the pressure controller 16.

Figure 3:
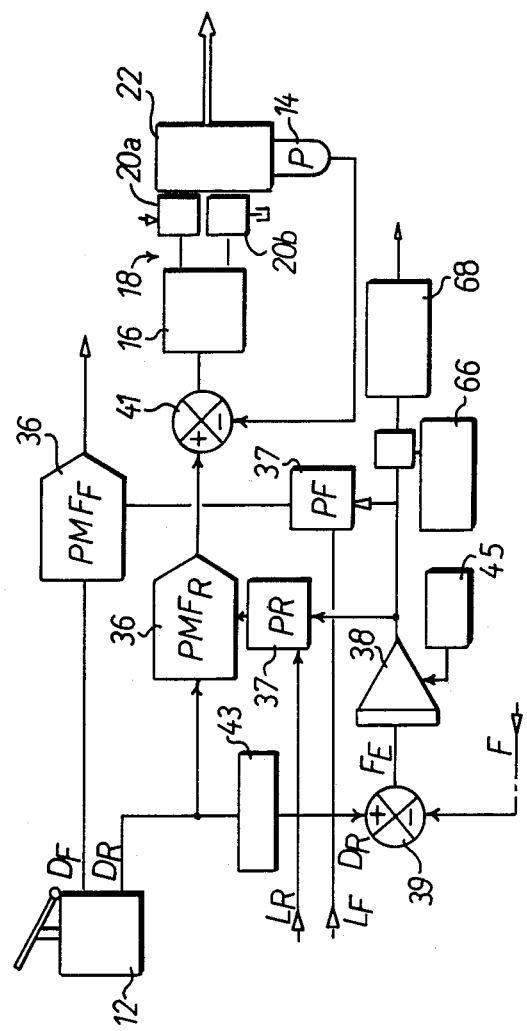
FIG. 3 illustrates the system of FIG. 2 in more detail.

The braking controller 28 of FIG. 2 is shown in more detail in FIG. 3 with the pressure controller shown for the rear channel only (the front channel is essentially a duplication of the rear channel and need therefore not be shown).

As explained above, in the present system, braking demand signals in electrical form are generated by the brake pedal transducer and are fed forward to the multiplier 36 which generate, internally, pressure demands for the braking circuits on each axle or wheel of the vehicle and which comprise the closed loop pressure controllers employing the electro-pneumatic or electro-hydraulic control valves 20 and pressure feedback elements 14.

In the system of FIG. 3, the pressure control loops receive the demand signals D as in the basic system of FIG. 1 but are incorporated into an overall deceleration control system in which deceleration errors $F_E$, formed from the difference between brake demand D and measured deceleration F, are utilised to adjust the fed forward pressure demand signals in a manner employing integral control action so as to cause the measured deceleration to become equal to the demand level. In the embodiment of FIG. 3, this means of adjustment is provided for each channel by a respective multiplier 36 in which one input is the brake demand signal $D_R$ or $D_F$ and the other input is a correction signal derived from a deceleration error integrator 38 via an apportioning device 37. This correction signal is continuously provided by the integrator 38 but the closed deceleration loop may be disabled at any chosen time by disconnection of the deceleration error from the integrator input, as described in detail hereinafter.

The demands $D_R$, $D_F$ generated by the duplex brake pedal transducer 12 are multiplied in the multipliers 36 by pressure modification factors ($PMF_R$), $PMF_F$) which are separate for the front and rear channels, as the signals from the integrator output are modified in the apportioning devices 37 by respective brake apportioning factors $P_F$ and $P_R$, set by the system designer in the simplest case. The brake demand D is also used to form the deceleration demands after filtering in a filter 43 designed to slow down input changes to a point where it is possible for the vehicle to achieve a similar response. The integrator 38 responds to the deceleration error $F_E$ provided that an overall system control supervisor 45 allows the loop to be closed, generating a slowly changing correction level which controls the multipliers 36 after adjustment by the apportioning factors $P_R$, $P_F$.

The adoption of a system using feed forward of the demand signal D has the function of directly applying the driver's braking demand (which represents a deceleration requirement) as a pressure demand signal, which recognises the fact that there can be no deceleration without applied braking pressure and that deceleration can be expected to be roughly proportional to said pressure. The advantages of applying such a feedforward signal and then correcting this with the integral of the deceleration error, include the following:

(a) The pressure demand can be applied at the same instant that the driver demand is detected and is not constrained by the normal correction rates of output signal change which, for an integral action controller, may be very slow.

(b) The braking controller which generates braking corrections from deceleration errors can fail without seriously affecting the braking system operation.

(c) Braking correction can be discontinued if vehicle speed is low or braking demand is below a preset threshold or in the initial moments of each braking sequence, leaving a basic pressure demand resulting from the driver braking demand.

A preferred means of apportioning would be to modify the integrator output which has a nominal value of unity when correction is zero, by a further multiplication process producing front and rear pressure modification factors $PMF_F$, $PMF_R$ from the product of integrator correction output and normalised front and rear load factors. These can be either assumed values based on expected load distribution or can be prefixed relationships to measured rear load figures provided by a suitable axle load measuring sensor or can be directly related to front and rear axle load measurements derived from separate sensors.

Thus, the integrator 38 is adapted to generate gradual correction of braking at a rate determined by the amplitude of the deceleration error $F_E$ and the integrator time constants when the deceleration loop is closed or hold any generated correction level when the loop is opened. The integrator 38 is, like other control elements of the system, engineered in digital terms and is not therefore subject to intrinsic decay or drift so that any established correction level can be held indefinitely if the input is discontinued.

The main deceleration feedback F for the vehicle is provided by an on-board decelerometer (such as decelerometer 34) or by deriving deceleration signals from wheel speed sensors by conversion processes which are well known; indeed the multiplicity of wheel speed signals generated in a vehicle equipped with an anti-lock system may permit a vehicle deceleration signal to be provided from a composite wheel speed signal known generally as the vehicle reference. The deceleration error $F_E$ is formed by comparing the braking demand signal $D_R$ with this, suitably scaled, vehicle deceleration measurement signal F to generate an integrator input $F_E$ which is positive if the vehicle deceleration is below the demand level in which case, the integrator output causes the braking pressures to be gradually increased until the error $F_E$ is reduced to zero. Conversely a vehicle deceleration which is greater than the demand level produces a negative error signal $F_E$ which is integrated by the integrator 38 to gradually reduce braking pressures until the desired deceleration level is achieved.

This integral action closed loop is arranged to be opened under several conditions, typically below a preset low speed threshold, below a preset low deceleration demand at the input and under some conditions where skidding is detected as taking place during braking and where further boosting of braking would be unwarranted. Also, where brake pressure levels have reached the maximum permitted system pressure, further increase of integrator correction is inhibited.

Figure 4:
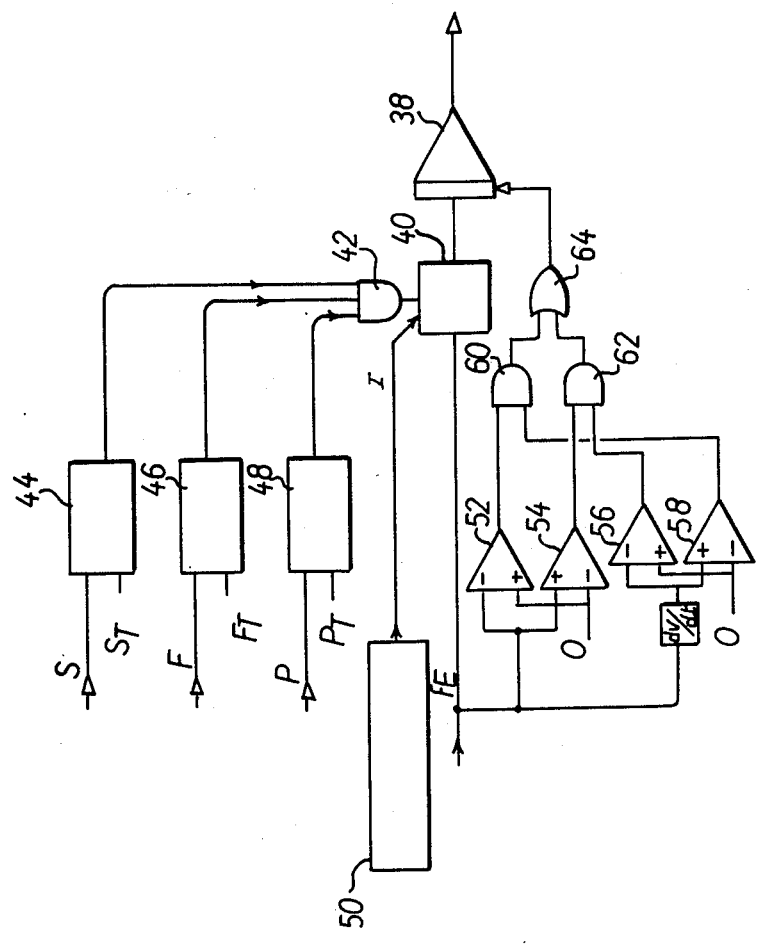
FIG. 4 illustrates one means of controlling the integrator in the system of FIG. 3.

The means for achieving inhibition of the integrator 38 are illustrated diagrammatically in FIG. 4, to which reference is now directed.

The deceleration error signal $F_E$ is supplied to the input of the integrator 38 by way of a controllable switch 40 which is switched to its ON condition via an AND gate 42 provided that (a) a speed comparator 44 detects that the vehicle speed S is greater than a predetermined threshold value $S_T$; (b) a deceleration comparator 46 detects that the vehicle deceleration F is greater than a predetermined threshold deceleration level $F_T$; (c) a pressure comparator 48 detects that the braking pressure P is below a predetermined maximum threshold level $P_T$; and (d) an inhibit signal I has not been generated by a wheel-lock detection means 50.

Thus the input to the integrator 38 is suppressed towards the end of each stop as the vehicle speed falls below the low speed threshold $S_T$, and once the vehicle is at rest the integrator can be reset. The integrator is, however, not necessarily reset to zero but preferably to a new start value which is based upon earlier correction levels generated. Optionally, a preset percentage of any correction built up on one stop can be used as the starting level for the next stop or a composite figure can be derived from a separate store in which a suitably scaled sum of all earlier correction levels is accumulated. This stored value is reduced by a certain proportion at each brake application or is allowed to decay away by being decremented by pulses occurring at regular time intervals.

Thus, by the use of integral control using the digital integrator 38, it is possible to open the control loop at any time and use the accumulated correction figure, yet maintain appropriate braking distribution between the two axles.

In addition, correcting the pressure demands D by the use of individual wheel or axle multipliers 36 has the advantage that input demands can only be adjusted by a percentage of the input demand, thereby preventing small demands being adjusted by large corrections which swamp the input.

Furthermore, the two axle systems can be built up separately to offer a split brake control system with overall loop correction being input from a single vehicle deceleration error channel. By cancellation of correction and assumption of a fault value near unity, the emergency operation of the braking system can be maintained by taking the original pedal demands as actual pressure demands and allowing correctly functioning pressure control loops to generate unmodified brake demands.

In certain vehicles, when subject to deceleration control, brake responses are seriously affected by non-linearities such as hysteresis and advantages in overall control responses can be achieved by arranging for the integrator 38 to have a plurality of different integrating time constants. Thus, where brakes exhibit a hysteresis effect, changes in demand can result in pressure changes which are immediate as a result of the pressure feedforward action but there is no deceleration change because the torque produced by the brakes does not alter. Under these circumstances deceleration error $F_E$ causes the output of the integrator 38 to build up at a rate dependent on the error level $F_E$ multiplied by the integrator time constant. A short time constant allows rapid correction of pressure which can easily result in overshoot if maintained once brake torque starts to respond. To overcome this problem, an integrator 38 modified to have a multi time constant, can make correction at a fast rate when the initial error is detected but can be arranged to reduce the correction rate to a very slow level once the vehicle deceleration starts to change in the direction which causes error to fall. In the extreme case, an intelligent integrator 38 can be employed to build up correction quickly when demand changes but the output quantity, deceleration, fails to follow and a proportion of this correction will be removed when the deceleration starts to respond.

One means of achieving such a variable control for the integrator 38 is illustrated in the lower half of FIG. 4 where the deceleration error $F_E$ is applied to the inverting input of a first comparator 52 and the non-inverting input of a second comparator 54. The other inputs of the comparators 52,54 are both held at zero. The rate of change of the deceleration error is supplied to the inverting and non-inverting inputs of third and fourth comparators 56,58, respectively, the other inputs of these comparators also being at zero. The output of comparator 52 (corresponding to a negative error) and the output of the comparator 58 (corresponding to a rising error) are applied to the inputs of an AND gate 60. The output of the comparator 56 (corresponding to a falling error) and the output of the comparator 54 (corresponding to a positive error) are applied to the inputs of an AND gate 62. The outputs of the AND gates 60,62 control the integrating rate of the integrator 38 via a gate 64 so as to select a slow rate once the vehicle deceleration starts to change in a direction causing the error to fall.

In a deceleration control system as described above, the driver demand D is a pressure demand but is interpreted by the system as a deceleration demand and pressures are adjusted if for any reason this deceleration level is not achieved or is exceeded. Inter alia, the cause of such errors can be attributed to vehicle load, to the vehicle operating gradient or to the collective condition of the brakes themselves and allowing the correction system to boost failing brakes will cause a hidden problem to be suddenly exposed when the maximum brake demand is called for in an emergency. A brake condition monitoring system is ideally required, which will generate an alarm condition whenever correction build up is giving brake boost greater than a preset figure. Examination of the effects on the braking system of load and grade show that for most vehicles, load is the major disturbance.

Thus, axle load measurements, which are known to be desirable for brake apportioning, are also important to calculating correction levels to be applied to each channel on a collective or individual basis by direct measurement of axle load. If in FIG. 3, the inputs to the brake apportioning devices 37 are formed from the actual load measurements $L_R$ and $L_F$, then even the zero correction figure of unity issued from the error integrator 38, is multiplied by normalised load readings in the apportioning devices 37 to generate main multiplier factors PMF which include load correction without this having to be generated by sensing deceleration error. Under these conditions the deceleration error integral should have values nearer to unity and should reflect the smaller gradient correction and a brake condition component. Over a day of normal running the correction levels due to gradient induced errors should cancel but the correction caused by brake condition should remain substantially constant so that the residual integrator output provides a measure of brake effectiveness for the vehicle as a whole. The alternative strategy outlined hereinbefore of storing a decaying figure formed from the sum of all 'end of stop' integrator outputs can now be modified by limiting the decay to yield an adaptive parameter to which the integrator is set at each new stop, say in the range of 0.5 to 2.0, which can also provide a brake condition monitor signal and indicate an alarm condition, to announce failing brakes if a figure, typically around 1.8, is exceeded.

This possibility is illustrated in FIG. 3 by the inclusion of an "end of stop" detector 66 and an "end of stop average store" 68 connected to the output of integrator 38. The "end of stop" circuit 66 is adapted to identify the end of each significant stop and to collect the integral correction by taking the integrator output—the preset base integrator start figure, to indicate the level of correction generated during the stop. This correction signal is scaled down and added into the end of Stop Average Store 68 in order to form the long term average correction over some tens of stops, which is thereby able to indicate the general brake condition.

In systems which are equipped with load sensors to correctly apportion braking between axles, the total vehicle load signal is formed and is able to offset the preset integral start figure, not only increasing pressure demands but making a correction allowance for load in the reduced correction values collected at the end of each stop.

By way of example, the control integrator 38 can be achieved by a digital computer simulation using an accumulating memory location which receives the addition of processed deceleration errors at regular preset intervals. The integrator can be reset at any point in time, to a preset starting point such as unity, or a scaled value representing unity. The integral correction developed at the end of any stop (or at the low speed point at which the correction changes are discontinued) can be determined by calculation of the difference between the integrator final reading and the stored integrator start figure.

Thus at the end of each vehicle stop, the integrating location can be reset to the stored integral start figure. This may be a preset base figure or may alternatively be a progressive figure formed from the previous integral start level plus a percentage of the integral correction developed during the stop. If this is the case, the stored integrator start figure is changed after each stop and control is thereby adapted to suit braking conditions.

EXAMPLE

Suppose the unity figure is 128. This is the base stored integrator start figure (SISF).
Integral correction=Integrator reading,
In - Stored integrator start figure SISF.
The routine is as shown below.

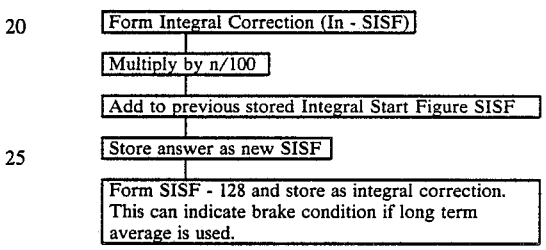

I claim:
1. A closed loop vehicle deceleration control system, comprising:
  (a) means for generating a driver's demand signal representing a deceleration requirement;
  (b) a plurality of pressure control channels for controlling the application of the vehicle brakes; said pressure control channels being themselves controlled by said driver's demand signal fed forward thereto;
  (c) means for measuring the vehicle deceleration;
  (d) a closed loop feedback circuit which is adapted to produce a deceleration error signal representative of the difference between a deceleration level demanded by the driver and the actual vehicle deceleration;
  (e) means for producing a correction signal for the driver's demand signal in dependence upon an integral function of the deceleration error; and
  (f) means for adjusting the driver's demand signal in accordance with said correction signal.

2. A closed loop vehicle deceleration control system according to claim 1, wherein the means for adjustment of the driver's demand signal comprises a multiplier in which one input is said driver's demand signal and the other input is said correction signal.

3. A closed loop vehicle deceleration control system according to claim 2 wherein said means for producing the correction signal comprises an integrator whose output provides said integral function of said deceleration error.

4. A closed loop vehicle deceleration control system according to claim 3, wherein the integrator provides a correction signal continuously but the system includes a means for disabling the closed deceleration loop at any selected time by disconnection of said deceleration error from the integrator input.

5. A closed loop vehicle deceleration control system as claimed in claim 4, having a means for detecting when the measured deceleration is below a predetermined level, a means for detecting when the vehicle speed is below a predetermined threshold and a means for detecting when brake pressures have reached a predetermined maximum permitted level, and a means for opening the integral action closed deceleration loop automatically when the measured deceleration is below said predetermined level, when the vehicle speed is below said predetermined threshold, and when brake pressure levels have reached said predetermined maximum permitted level.

6. A closed loop vehicle deceleration control system according to claim 2, including an apportioning means by which said integrated deceleration error signal is itself modified prior to multiplication in said multiplier with the driver's demand signal.

7. A closed loop vehicle deceleration control system, according to claim 6, including means for measuring the vehicle axle load, and wherein said apportioning means modifies the integrated deceleration error in accordance with vehicle axle load as measured by said vehicle axle load measuring means.

8. A closed loop vehicle deceleration control system according to claim 6, wherein the apportioning means is arranged to modify the integrated deceleration error in accordance with actual axle load measurements whereby to cause individual channel correction to be applied to said multiplier so that any integral correction is modified by a load figure for that channel, causing the deceleration error to be made up from error sources other than vehicle load so that the integral correction figure at the end of each vehicle stop can be accumulated to generate a brake condition monitoring factor of performance over a series of stops.

9. A closed loop vehicle deceleration control system according to claim 2, wherein the integral correction is made at more than one possible speed of integration depending upon deceleration response to a change of demand, the integration being carried out at an initial fast integrating rate followed by a slower rate as the vehicle deceleration starts to response.

10. A closed loop vehicle deceleration control system according to claim 9, including a means for generating a driver warning when said accumulated monitoring factor reaches a preset alarm level so as to prevent the closed loop systems masking brake deterioration by generating large brake boost factors.

11. A closed loop vehicle deceleration control system according to claim 2, wherein the integral correction is made at more than one possible speed of integration, and wherein the integrating action takes place normally at a fast rate but the integral correction built up during the time between demand change and vehicle declaration starting to respond is suddenly reduced by a preset proportion once this said response is detected.

12. A closed loop vehicle deceleration control system according to claim 1, wherein individual pressure demands for each control channel are generated by forming the product of said driver braking demand signal, the integrated deceleration error signal and an apportioning factor.

13. A closed loop vehicle deceleration control system according to claim 12, wherein said apportioning factor is a preset constant.

14. A closed loop vehicle deceleration control system according to claim 12, including means sensing the load on at least one axle of the vehicle, said apportioning factor being based on the sensed axle load.

* * * * *